United States Patent
Marks et al.

(10) Patent No.: US 7,357,713 B2
(45) Date of Patent: Apr. 15, 2008

(54) ELECTRONIC GAME AND METHOD FOR PLAYING A GAME BASED UPON REMOVAL AND REPLACING SYMBOLS IN THE GAME METRIX

(75) Inventors: Daniel Marks, Nyack, NY (US);
Anthony Singer, Ringwood, NJ (US);
Howard Marks, Irvington, NY (US)

(73) Assignee: IGT, Reno, NV (US)

( * ) Notice: Subject to any disclaimer, the term of this patent is extended or adjusted under 35 U.S.C. 154(b) by 447 days.

(21) Appl. No.: 11/073,884

(22) Filed: Mar. 7, 2005

(65) Prior Publication Data

US 2005/0148381 A1    Jul. 7, 2005

Related U.S. Application Data

(63) Continuation of application No. 10/229,870, filed on Aug. 27, 2002, now Pat. No. 6,910,962.

(60) Provisional application No. 60/331,016, filed on Nov. 6, 2001.

(51) Int. Cl.
*A63F 9/28* (2006.01)
*A63F 13/00* (2006.01)
(52) U.S. Cl. ............... 463/16; 463/15; 463/20; 463/22
(58) Field of Classification Search ............ 463/9, 463/13, 16–22, 25
See application file for complete search history.

(56) References Cited

U.S. PATENT DOCUMENTS

| | | |
|---|---|---|
| 4,099,722 A | 7/1978 | Rodesch et al. |
| 4,200,291 A | 4/1980 | Hooker |
| 4,636,951 A | 1/1987 | Harlick |
| 4,695,053 A | 9/1987 | Vazquez et al. |
| 4,874,173 A | 10/1989 | Kishishita |
| 5,205,555 A | 4/1993 | Hamano |
| RE34,244 E | 5/1993 | Hagiwara |
| 5,564,700 A | 10/1996 | Celona |
| 5,624,119 A | 4/1997 | Leake |
| 5,704,835 A | 1/1998 | Dietz, II |
| 5,720,662 A | 2/1998 | Holmes, Jr. et al. |
| 5,769,716 A | 6/1998 | Saffari et al. |
| 5,807,172 A | 9/1998 | Piechowiak |
| 5,813,911 A | 9/1998 | Margolin |
| 5,882,260 A | 3/1999 | Marks et al. |
| 5,951,397 A | 9/1999 | Dickinson |

(Continued)

FOREIGN PATENT DOCUMENTS

EP    058488    8/1982

(Continued)

*Primary Examiner*—Robert E. Pezzuto
*Assistant Examiner*—Joshua P. Wert
(74) *Attorney, Agent, or Firm*—Bell Boyd & Lloyd LLP

(57) ABSTRACT

Payout methods in a mechanical, an electro-mechanical and/or computer-based slot machine-like games-of-chance enable a series of awards based upon: appearance of predetermined symbol combinations in the symbol matrix; issuance of awards for the predetermined combination of symbols; removal of the winning symbol combinations from the symbol matrix; replacement of removed symbols with other symbols; issuance of awards for predetermined combination of symbols in the symbol matrix; and recurring cycles of award, removal and replacement until no winning symbol combinations appear in the symbol matrix.

41 Claims, 3 Drawing Sheets

U.S. PATENT DOCUMENTS

| | | |
|---|---|---|
| 5,980,384 A | 11/1999 | Barrie |
| 6,089,977 A | 7/2000 | Bennett |
| 6,117,013 A | 9/2000 | Eiba |
| 6,120,377 A * | 9/2000 | McGinnis et al. ............ 463/20 |
| 6,174,235 B1 | 1/2001 | Walker et al. |
| 6,220,959 B1 | 4/2001 | Holmes et al. |
| 6,224,484 B1 | 5/2001 | Okuda et al. |
| 6,227,971 B1 | 5/2001 | Weiss |
| 6,241,607 B1 | 6/2001 | Payne et al. |
| 6,251,013 B1 | 6/2001 | Bennett |
| 6,319,124 B1 | 11/2001 | Baerlocher et al. |
| 6,347,996 B1 * | 2/2002 | Gilmore et al. ............... 463/17 |
| 6,394,902 B1 | 5/2002 | Glavich et al. |
| 6,398,644 B1 | 6/2002 | Perrie et al. |
| 6,409,602 B1 | 6/2002 | Wiltshire et al. |
| 6,413,162 B1 | 7/2002 | Baerlocher et al. |
| 6,419,579 B1 | 7/2002 | Bennett |
| 6,604,740 B1 | 8/2003 | Singer et al. |
| 6,666,767 B1 | 12/2003 | Dayan |
| 6,695,696 B1 | 2/2004 | Kaminkow |
| 6,702,671 B2 | 3/2004 | Tarantino |
| 6,712,693 B1 | 3/2004 | Hettinger |
| 6,855,054 B2 * | 2/2005 | White et al. .................. 463/21 |
| 6,960,133 B1 | 11/2005 | Marks et al. |
| 7,070,502 B1 | 7/2006 | Bussick et al. |
| 7,144,322 B2 * | 12/2006 | Gomez et al. ................ 463/20 |
| 2002/0077165 A1 | 6/2002 | Bansemer et al. |
| 2003/0045345 A1 | 3/2003 | Berman |
| 2003/0054874 A1 | 3/2003 | Kaminkow |
| 2003/0057645 A1 | 3/2003 | Baerlocher et al. |
| 2003/0060267 A1 | 3/2003 | Glavich et al. |
| 2003/0100356 A1 * | 5/2003 | Brown et al. .................. 463/9 |
| 2004/0033829 A1 | 2/2004 | Pacey et al. |
| 2005/0282620 A1 | 12/2005 | Marks et al. |
| 2005/0288094 A1 | 12/2005 | Marks et al. |
| 2006/0172795 A1 | 8/2006 | Bussick et al. |

FOREIGN PATENT DOCUMENTS

| | | |
|---|---|---|
| EP | 60019 A * | 9/1982 |
| EP | 1 063 622 | 12/2000 |
| GB | 1 454 046 | 10/1976 |
| GB | 2 062 922 | 5/1981 |
| GB | 2 106 293 | 9/1981 |
| GB | 2 097 160 | 10/1982 |
| GB | 2 106 295 | 4/1983 |
| GB | 2 165 385 | 4/1986 |
| GB | 2 243 236 | 4/1990 |
| GB | 2 372 132 | 2/2001 |
| WO | WO 98/20949 | 5/1998 |
| WO | WO 00/30727 | 6/2000 |

* cited by examiner

ELECTRONIC GAME AND METHOD FOR PLAYING A GAME BASED UPON REMOVAL AND REPLACING SYMBOLS IN THE GAME METRIX

CROSS-REFERENCE TO RELATED APPLICATIONS

The present application is a continuation of application Ser. No. 10/229,870, filed Aug. 27, 2002, now U.S. Pat. No. 6,910,962 entitled "Electronic Game and Method for Playing a Game Based on Removal and Replacing Symbols in the Game Matrix", and this application also claims the benefit of application Ser. No. 60/331,016, filed Nov. 6, 2001.

FIELD OF THE INVENTION

The present invention relates to an electronic novelty and wagering game having an electronic display, a controlling processor presenting a game symbol matrix where matching symbol combinations result in an award and the symbols are removed and replaced. Awards are issued based upon the initial wager and type of symbol combinations until there are no matching symbol combinations.

BACKGROUND OF THE INVENTION

Electronic games have become a popular form of entertainment. These games may be casino, wagering type games where a player deposits money in the form of coins, gaming tokens or paper currency either into a coin acceptor-tester or bill acceptor ("the coin-in"). The coins and gaming tokens are collected in a reservoir inside the gaming machine ("the hopper") while the paper currency is collected in the bill acceptor inside the gaming machine. If the coins, gaming tokens or paper currency are validated as authentic, the player accrues the appropriate number of playing units ("credits") on a credit meter on the gaming machine depending on the denomination of the wager as set on the gaming machine. For example, a twenty-five cent gaming machine will accrue four credits for each dollar deposited into the gaming machine by way of the coin head or the bill acceptor.

After accruing credits on the credit meter, the player determines how many credits he wishes to wager on the next spin of the slot reels ("total bet") and then spins the reels by pressing the spin button or by pulling a handle. When prompted by pushing a spin button or pulling a handle, a controlling processor randomly selects and outcome and controls a display to display the outcome. The display may consist of electro-mechanical reels or a VRT or plasma display. In many modern machines, the outcome is in the form of a 3×3 or 3×5 matrix of game symbols. The processor compares the outcome to determine if one or more predetermined winning outcomes have been obtained. For each winning outcome, which may be predetermined symbol combinations along any enabled pay line for the machine or a set of predetermined scattered symbols, the processor issues an award to the player. After the award based upon the outcome of the spin has been issued based upon the display of symbols, the player inputs another wager and prompts a further spin.

In some slot machines, certain symbol combinations can trigger a bonus event, such as a bonus screen through which the player can win an additional award.

In another unrelated, prior art game referred to as "Bedazzled" and available for play as an amusement game on the Internet, there is a computer generated matrix of game symbols, each randomly assigned into a coordinate of the matrix defined by horizontal rows and vertical columns. To play the game the player may, using a computer keyboard or mouse, exchange the positions of adjacent symbols in a horizontal row to obtain a set or sets of three or more like symbols in a horizontal row or a vertical column. When a set is created, the computer controls the game to issue the player an award of points based upon the symbol set(s), remove the matching set(s) from the display, shift the symbols above the removed set(s) downward into the positions of the removed symbols and reconstitute the matrix by selecting and displaying replacement symbols at the upper row of the matrix. The player continues with the game for so long as sets can be assembled by exchange the positions of horizontal adjacent symbols. By exchanging symbols the player can amass game points. The game progresses through certain scoring levels, with each successive scoring level becoming more difficult by the addition of another group of symbols to the symbol pool.

A drawback of this game is that it is not a casino-type wagering game and thus provides no mechanism by which a player may make a wager. In this regard the Bedazzled game is not configured to assign winning awards based upon player wagers to meet regulatory or commercial requirements.

There is a need to provide players with an ever increasing number of entertainment options in the form of new games.

It is an object of the present invention to provide a new game in the form of a game matrix where awards are based upon and issued for obtaining predetermined winning outcomes of symbol sets, arranged for example in adjacent same symbol sets such as horizontally, vertically, diagonally or in an L-shaped arrangement.

It is a further object of the present invention to provide a game where winning outcome sets are removed from the matrix and are replaced to re-constitute the matrix and possibly define more winning outcome sets, still based upon the original wager.

It is another object to configure a game having the above objects which can meet gaming regulatory as well a commercial performance standards.

The present invention enables the casino to attract and retain players interested in playing an innovative slot game and the player enjoys a new method of receiving an award.

SUMMARY OF THE INVENTION

The present invention includes a device and method for playing a game wherein a matrix of symbols is presented and the player is awarded based upon matching sets of game symbols. According to other embodiments, the award may include wild, multiplying or scatter symbol pays. The game ends, in one embodiment, when there are no more winning sets.

Accordingly in one aspect of the present invention there is set forth an electronic game device for a player which includes a display, a game processor and a data structure storing data representing a plurality of game symbols and data representing a predetermined award schedule for winning outcome sets of symbols. A wager input apparatus is provided for the player to input a wager corresponding to at least one symbol type to play the game and prompt play of a hand of play of the game. The processor is configured to, in response to prompting of play, (i) select, assign and control the display to display a selected game symbol into each coordinate of a game matrix having columns C and rows R, where C and R are at least 3, (ii) compare the symbols of the coordinates to determine whether a predetermined number of like symbols are disposed in at least one predetermined winning pattern defining a winning outcome set, e.g. vertically, horizontally or L-shaped adjacent sets of three like symbol types (iii) if the wagered upon symbol type is arranged in a predetermined winning pattern to issue the predetermined award, (iv) remove the symbols of each winning outcome set from the display, (v) select, assign and display symbols to replace the removed symbols to reconstitute the game matrix and (vi) repeat steps (i) through (v) until there are no winning outcome sets.

Included in the data structure may be symbols designated as "wild" for at least one symbol type; multiplying symbols which if, for example, are included in a winning outcome set multiply the award; static symbols which cannot form winning outcome sets as well as scatter pay symbols.

A method for playing an electronic wagering game is also set forth which includes:

(A) providing an electronic display and a game computer processor storing in a data structure data representing game symbol kinds and data representing a predetermined award schedule for winning outcome sets of a predetermined number of symbols arranged in adjacent relationships;

(B) the player making a wager to play the game, the processor (i) controlling the display to display a game matrix having C columns and R rows where C and R are at least 3 and defining coordinates and (ii) selecting, assigning and displaying from the data structure a game symbol into each matrix coordinate;

(C) the processor (i) comparing the symbols of the matrix to the schedule to determine if any of the symbols are arranged to define at least one winning outcome set S, (ii) for each determined set S the processor removing the winning outcome set S symbols from the display and selecting and displaying additional symbols to reconstitute the game matrix to have a game symbol for each coordinate, (iii) repeating steps (C)(i)-(C)(ii), and (iii) issuing an award to the player for each winning outcome set S according to the award schedule; and (D) the processor concluding the game when it has determined there are no remaining winning outcome sets S.

The winning outcome sets may be a predetermined number of like symbol types arranged in adjacent positions in the matrix. The method may also include providing scatter pay symbols and issuing an award based upon the number of scatter pay symbols in the matrix, wild symbols, multiplier symbols and the like.

The device and method of the present invention provides a new game and method which provides the player with multiple wagering opportunities, multiple opportunities to win and a game where a player can continue to win over a series of displays as symbols for winning sets, are removed from the display and are replaced.

BRIEF DESCRIPTION OF THE DRAWINGS

These and other features and advantages will become appreciated as the same becomes better understood with reference to the specification, claims and drawings wherein;

DETAILED DESCRIPTION OF THE PREFERRED EMBODIMENTS

Figure 1:
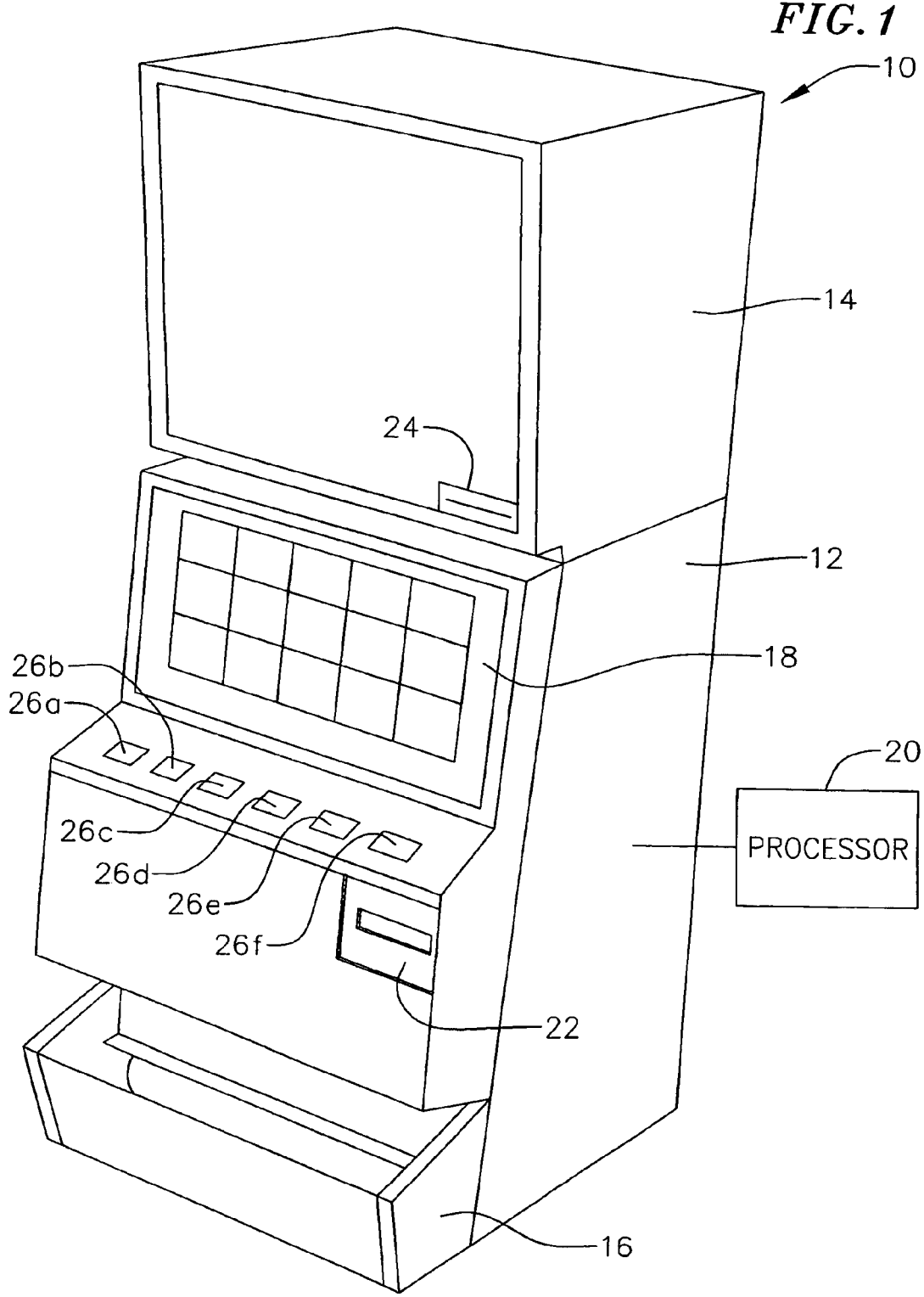
FIG. 1 illustrates a game deice according to the present invention having a game display showing game symbols.

Turning to FIG. 1, there is shown a game apparatus 10 according to an embodiment of the present invention. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The apparatus 10, shown embodied as an upright gaming device, has a housing 12 which includes an upper portion 14 which may include graphics and/or backlit panels to identify the game or to attract players and other information for the player. For example, the upper portion may display the pay table for the game as hereinafter described. The housing 12 is adapted to sit on a slot machine cabinet (not shown) or the like. At the bottom thereof the housing 12 mounts a tray 16 which captures coins/tokens dispensed by the apparatus 10. The housing 12 also mounts and supports a game display 18 which may be an electro-mechanical reel set display or, more preferably, a video display.

Disposed within the housing, according to the present embodiment, is a game processor 20. As will hereinafter be described, the processor 20 controls the various operations and play of the game according to the present invention.

The apparatus 10 may also include a token acceptor (not shown) of the type known in the art and/or a cash validator 22 of known construction. Cash or script bills inserted into the validator 22 convert the cash value into a corresponding number of credits based upon the denomination, e.g. 5¢, 25¢, $1.00, of the machine, as is known in the art. The processor 20 controls the display 18 to display at a credit meter (not shown) the accumulated credits available for play of the game. Thus the player can accumulate credits for play by inserting cash or script into the validator 22.

The apparatus 10 may also mount a player tracking module 24 to read an instrument, such as a machine readable player tracking card (not shown) by which the play of the player at the apparatus 10 may be monitored for purposes well known in the art.

To control play of the game as hereinafter described, data input and prompting apparatus are provided. As shown in FIG. 1 for this purpose the housing 12 mounts a plurality of control buttons 26a-f. Button 26a is provided for the player to select which game symbol(s) the player wishes to wager upon. Button 26b provides for the player to enter the desired wager per selected symbol(s) in one unit increments between a minimum (1 unit/symbol) and a maximum (e.g. 5 units/symbol), although any suitable maximum number of symbols may be used. Button 26c is a Spin Button to prompt play of the game, i.e. play a hand of the game, button 26d is a Max Bet button whereby the player wagers on all symbols to the maximum limit and simultaneously prompts play of a hand and button 26e is a pay table button which, if depressed causes the display 18 to display the pays and winning outcomes for the game. Finally button 26f is a "Help" button which, if depressed, causes the display to display the rules of the game and other information to help the player. These buttons may be embodied as suitable areas or locations on a touch screen display 18 as well. Where the game is played with a personal computer such as a novelty game or an Internet game, the data input apparatus may be a keyboard or mouse or other suitable input device.

To play the game, the player first enters credits by, for example, inserting a cash note in to the validator 22. The number of credits available for play are displayed at an appropriate credit meter (not shown). Using the data input apparatus, the player selects the game symbol type(s) he wishes to wager upon. For example, there may be a plurality of symbol types such as seven and as suggested in FIG. 2. While the symbols may be anything such as numbers, letters or indicia which may be consistent with the game theme, for purposes of illustration for this description, it shall be assumed that there are seven symbol types depicting gems identified by letters as set forth in Table 1 below. Thus, for the following description letters shall be used to refer to the game symbols for simplifying the explanation.

TABLE 1

| Letter | Game Symbol |
|---|---|
| T | Diamond |
| U | Spinel |
| V | Pearl |
| W | Garnet |
| X | Emerald |
| Y | Aquamarine |
| Z | Ruby |

Figure 2:
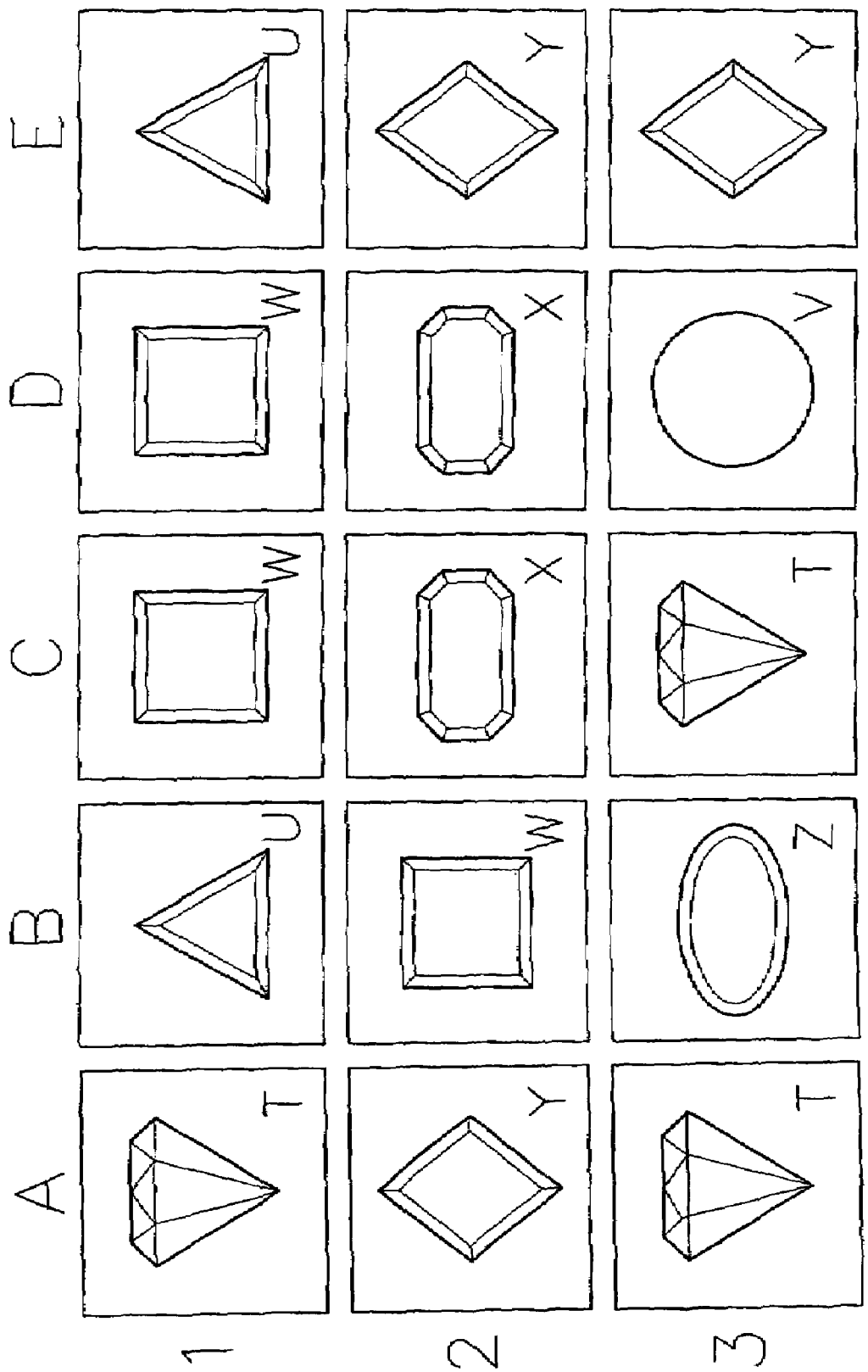
FIG. 2 shows a game display with game symbols for purposes of illustration.

Thus, with reference to FIG. 2, there is shown an example of how the game symbols may be displayed at the display 18 game matrix.

The selection of the symbols to wager upon may be arranged according to a predetermined protocol such as, suggested in Table 2 below.

TABLE 2

| Wager (units) | Symbol and per symbol wager |
|---|---|
| 1 | T(1) |
| 2 | T(1), U(1) |
| 3 | T(1), U(1), V(1) |
| . | |
| . | |
| . | |
| 7 | All symbols (1) |
| 8 | T(2), all other symbols (1) |
| 9 | T(2), U(2), all other symbols (1) |
| . | |
| . | |
| . | |
| 35 | All symbols (5) |

Alternatively the player can be provided with means to select symbols (without any regard to protocol) to wager upon.

Data representing the game symbols may be stored in a suitable data structure such as a random access memory (ram), or other accessible data storage device including a disk, compact disk or the like. The data structure is configured to represent (1) the universe of game symbols which may be selected or displayed as well as distributions of each symbol-type within that universe such that, for any random selection, each symbol has a predetermined probability of being selected. This feature may be accomplished through various known means such random number selection and symbol mapping or the like. Suffice it to say that the processor and data structure are configured such that when game play is prompted the processor, in effect, randomly selects from the universe of game symbols, symbols for display at the game display 20.

As shown in FIG. 2, the display 20 may be in matrix-form having rows R and columns C where C and R are at least 3. If FIG. 2 there is shown a 3×5 matrix defining fifteen coordinates each having an address defined by the intersecting row and column. For example, symbol U, a Spinel, is at coordinate 1(row) B (column).

After the player has set his wager on the symbols, play of the game hand is prompted. The processor 20 randomly selects, assigns to coordinates and controls the display 18 to display the initial outcome. For purposes of this description it shall be assumed that the player has wagered three units on each of the seven symbols for a total wager of twenty-one units.

1. Base Game

After the player has set his desired wager, the player depresses spin button 26c whereupon the game processor 20 randomly selects game symbols and, in effect, assigns the same into the coordinates of the matrix for display thereof. The display of the game symbols may be in a fashion to simulate spinning of reels, i.e. columns C, in which symbols "fall" from the top of the screen into positions in the matrix. The falling symbols fill the matrix from the bottom row to the top row; and from left to right in the bottom row, right to left in the middle row, and left to right in the top row. Any other suitable manner of having the symbols fill the matrix may be used.

In a preferred embodiment of the present invention, the symbol set includes seven symbols. For each spin, the machine randomly displays three symbols from the symbol set on each reel (column C). Each of the symbols is related to the theme of the game which may be a mining and precious stones theme (i.e. rubies, diamonds, emeralds, etc.) as suggested in FIG. 2.

Upon selection, assignment and display of the game symbols into the matrix defining an initial outcome, the processor 20 compares the symbols and their positions to determine if the initial outcome has any winning symbol combinations for which the player is entitled to an award. In the preferred embodiment of the present invention, the player receives awards for all contiguous symbol combinations meeting the following requirements. There must be (i) 3 or more of the same symbols, e.g. Diamonds, which are (ii) arranged adjacently in vertical, horizontal or L-shaped directions or combinations thereof; (iii) starting in any column or row; (iv) using any number of symbols per column and (v) comprised of symbols wagered upon by the player. The player, therefore, receives awards for any and all contiguous symbol combinations in the horizontal, vertical or L-shaped directions comprised of symbols wagered upon by the player, with each combination awarding the pay indicated on the game's pay table times the amount wagered on that symbol.

As an example, the device and method may have a pay table according to Table 3 set forth below. It should be understood that other pay tables may be provided as well based upon the number of game symbol types, game symbol type distribution, desired game performance or the like.

TABLE 3

| PAY TABLE: Symbol/Contiguous Symbols | | | | | | | |
|---|---|---|---|---|---|---|---|
| | 3 | 4 | 5 | 6 | 7 | 8 | 9 | 10 |
| T | 1 | 2 | 4 | 8 | 16 | 32 | 64 | 128 |
| U | 2 | 4 | 8 | 16 | 32 | 64 | 128 | 256 |
| V | 3 | 6 | 12 | 24 | 48 | 96 | 192 | 384 |
| W | 4 | 8 | 16 | 32 | 64 | 128 | 256 | 512 |

TABLE 3-continued

PAY TABLE: Symbol/Contiguous Symbols

|   | 3 | 4  | 5  | 6  | 7   | 8   | 9   | 10   |
|---|---|----|----|----|-----|-----|-----|------|
| X | 5 | 10 | 20 | 40 | 80  | 160 | 320 | 640  |
| Y | 6 | 12 | 24 | 48 | 96  | 192 | 384 | 768  |
| Z | 8 | 16 | 32 | 64 | 128 | 256 | 512 | 1024 |

As an example of play and with reference to FIG. 2, using the letters T-G to represent the symbols, the game displays an initial outcome the following symbols:

| T | U | W | W | U |
|---|---|---|---|---|
| Y | W | W | V | Y |
| T | Z | T | V | Y |

The winning symbol combination is shown in bold and the player would receive an award of 24 credits (3 units wagered×8) for a winning symbol combination of garnets W-W-W-W. The award reflects the game pay table which states that W-W-W-W, anywhere in the symbol matrix, pays 8 credits for each credit wagered upon the symbol; or 8 credits times 3 credits wagered by on symbol W. The game Paid meter increases to reflect the win of 24 units.

Following the award based upon the initial outcome, all of the "W" symbols in the winning symbol combination are removed and the game displays the following symbols:

| T | U | — | — | U |
|---|---|---|---|---|
| Y | — | — | X | Y |
| T | Z | T | V | Y |

(Removed symbols indicated by "—".)

The remaining symbols then "slide" down the columns (slot reels) and the game displays the following symbols:

| T | — | — | — | U |
|---|---|---|---|---|
| Y | U | — | X | Y |
| T | Z | T | V | Y |

(Sliding symbol in bold.)
(Removed symbols indicated by "—".)

The game processor 20 then randomly selects and controls the display 18 to show the newly selected symbols "dropping" into the symbol matrix from the top of the display 18 to reconstitute the matrix to have a symbol in each coordinate of the matrix. For example, with the new symbols replacing the positions vacated by the removed and sliding symbols, the matrix may have the following symbol composition:

| T | <u>Y</u> | X | <u>X</u> | U |
|---|---|---|---|---|
| Y | U | X | X | Y |
| T | Z | T | V | Y |

(New symbols underlined.)
(Winning symbol combination in bold.)

The device 10 and method, awards an additional 30 credits for a new winning symbol combination of X-X-X-X created by the reconstitution of the matrix. The award reflects the game pay table which states that X-X-X-X, anywhere in the symbol matrix, pays 10 credits for each credit wagered upon the symbol; or 10 credits times 3 credits wagered. The game paid meter increases 30 credits from 24 to 54.

Following the award, all of the "X" symbols in the winning symbol combination is removed and the game displays the following symbols:

| T | Y | — | — | U |
|---|---|---|---|---|
| Y | U | — | — | Y |
| T | Z | T | V | Y |

(Removed symbols indicated by "—".)

No symbols need to slide, so the game proceeds directly to the replacement/reconstitution stage. Newly selected symbols "drop" into the symbol matrix from the top of the display 18 and the game displays the following symbols:

| T | Y | <u>Y</u> | <u>Y</u> | U |
|---|---|---|---|---|
| Y | U | <u>U</u> | <u>Y</u> | Y |
| T | Z | T | V | Y |

(New symbols underlined.)
(Winning symbol combination in bold.)

The game awards an additional 144 credits for a winning symbol combination of Y-Y-Y-Y-Y. The "Y" symbol in symbol position C1/R2 (middle of left-most column) is not part of the winning symbol combination since it is not contiguous in either the horizontal or vertical direction to the other "Y" symbols. The award reflects the game pay table which states that Y-Y-Y-Y-Y, anywhere in the symbol matrix, pays 48 credits for each credit wagered upon the symbol; or 48 credits times 3 credits wagered on each symbol. The game paid meter increases 144 credits from 54 to 198.

Following the award, all of the "Y" symbols in the winning symbol combination are removed and the game displays the following symbols:

| T | — | — | — | U |
|---|---|---|---|---|
| Y | U | U | — | — |
| T | Z | T | V | — |

(Removed symbols indicated by "—".)

The remaining symbols then "slide" down the columns (reels) and the game displays the following symbols:

| T | — | — | — | — |
|---|---|---|---|---|
| Y | U | U | — | — |
| T | Z | T | V | U |

(Sliding symbol in bold.)
(Removed symbols indicated by "—".)

New symbols selected by the processor 20 then "drop" into the symbol matrix from the top of the display 18 and the game displays the following symbols:

| T | <u>U</u> | <u>U</u> | <u>V</u> | <u>T</u> |
|---|---|---|---|---|
| Y | U | Z | <u>V</u> | <u>W</u> |
| T | Z | T | V | U |

(New symbols <u>underlined</u>.)
(Winning symbol combination in bold.)

The game awards an additional 15 credits for winning symbol combinations of U-U-U and V-V-V. The award reflects the game pay table for the U-U-U combination and the V-V-V combination, anywhere in the symbol matrix.

Following the award, all of the "U" and "V" symbols in the winning symbol combinations are removed and the game displays the following symbols:

| T | — | — | — | T |
|---|---|---|---|---|
| Y | — | Z | — | W |
| T | Z | T | — | U |

(Removed symbols indicated by "—".)

No symbols need to slide, so the game proceeds directly to the replacement/reconstitution stage. New symbols selected by the processor 20 "drop" into the symbol matrix from the top of the display 18 and the game displays the following symbols:

| A | W | W | B | A |
|---|---|---|---|---|
| F | X | Z | V | W |
| T | Z | T | X | T |

(New symbols underlined.)

With no contiguous symbol combinations of three or more same symbols in the horizontal and/or vertical direction, the game ends.

At the end of each game hand or "spin", the player may change his bet and play a new game, use the same wager and play a new game, view the help screen and/or the pay table, and/or cash out any credits that the player has accrued.

The reconstitution of the matrix may also be done by the processor 20 selecting symbols and placing them directly into the matrix without the need for sliding symbols down into position.

Further the game may also provide for horizontal sliding of game symbols in stead of or in lieu of the vertical reposition of symbols for the removed symbols described above.

Figure 3:
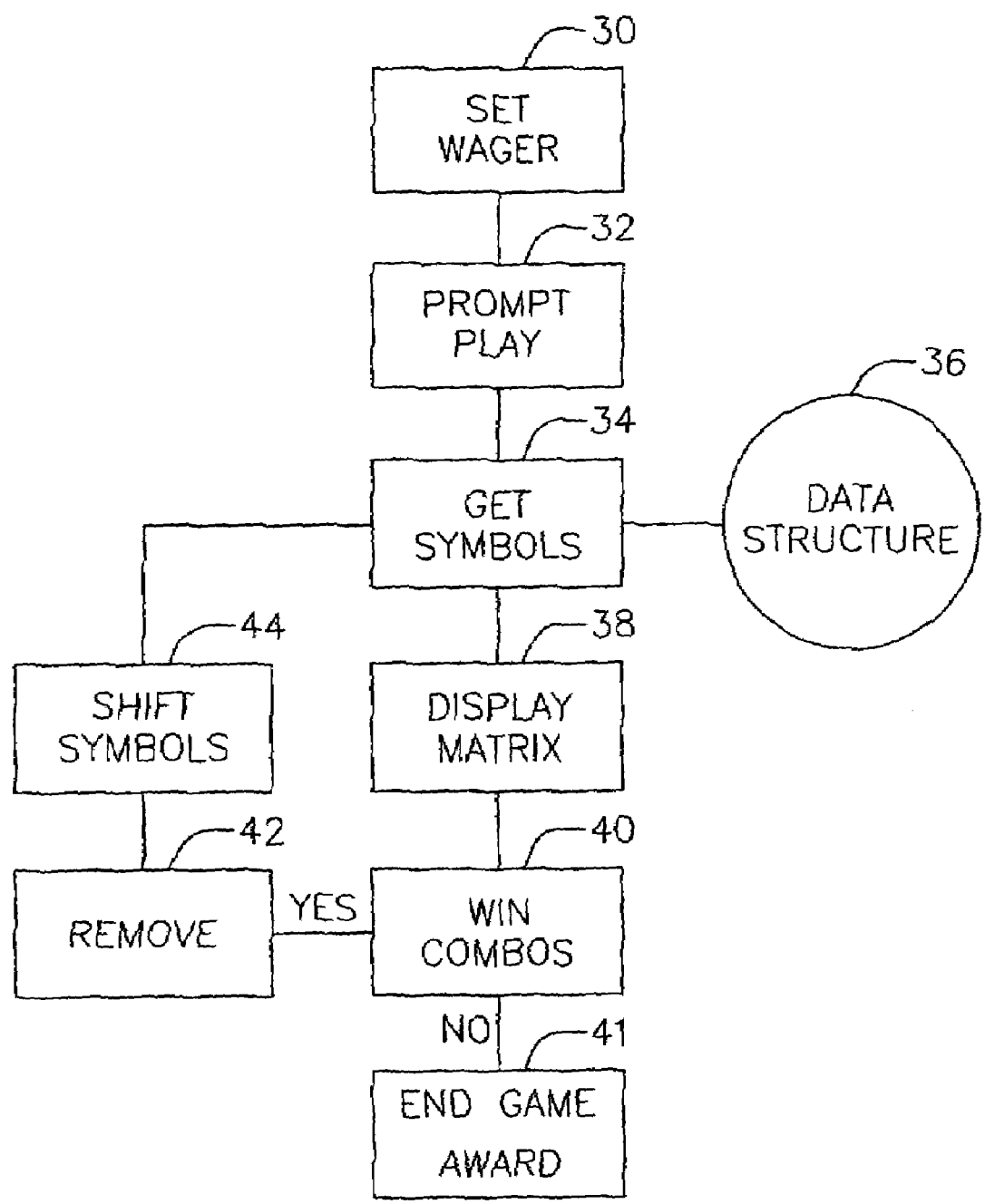
FIG. 3 is a logic diagram for the game.

FIG. 3 shows a logic diagram for the play of the base game. At 30 the player sets their wager in the amount and on the symbols desired. As stated above there may be a predetermined protocol for setting of wagers. At 32 the player prompts play of a hand or "spin" of the game. It should be noted that where the player wagers a maximum amount, prompting of play is automatically initiated. In response to prompting of play the processor 20 at 34 randomly selects a sufficient number of game symbols to fill the game matrix at the display from a data structure 36. The data structure stores data representing the game symbols types, i.e. seven different types of game symbols. In order to provide differing distributions, the data may be arranged with addresses 1-N, with game symbol data at each address. The symbol data stored at the addresses may be in the desired number of each symbol type to provide the desired distribution of symbol types in the symbol universe of 1-n addresses, e.g. 300 Diamond symbols, 453 Ruby symbols, etc. Alternatively, the processor 20 and data structure 36 may be configured such that the processor 20 randomly selects a number from a predetermined universe of numbers and the selected number is mapped to the data structure 36 for selection of a symbol type. By configuring the mapping, each symbol type will have a predetermined probability of being selected.

At 38 the processor 20 displays the matrix of selected game symbols and at 40 compares the symbols selected and displayed at the display 18 matrix to determine if the display of the initial selection of symbols has resulting in any winning combinations of three or more symbols. If there are no winning combinations, the game is ended at 41 with no award. If there are one or more winning combinations an award is issued and at 42 the winning combinations are removed from the display and at 44 the remaining symbols are slid or moved in the manner described above (if necessary) to fill the positions vacated by the removed symbols. At 34 the processor 20 gets new symbols and controls at 38 the display 18 to display the matrix as reconstituted. Again, at 40 the matrix is tested for winning combinations. This procedure loops until, at 40, there are no more winning combinations at which time the award(s) are issued and the game is ended.

The award(s), if any, may be issued as each winning combination is determined or as the aggregate award at the end of the game.

As can be appreciated, the removal of the winning symbol combinations and reconstitution of the matrix in a recursive fashion provides the player with multiple opportunities to obtain winning combinations and awards. Further the game provides for excitement in that the player anticipates reconstitution resulting in new winning combinations with the new symbols, inter se, or with pre-existing symbols.

2. Bonus Features

The Base Game of the device 10 and method of the present invention may be provided with additional features. For example, during play of the base games, the player may receive special pays for bonus features, such as Wild Symbols and Scatter pays.

Wild Symbols. The data structure is provided with data representing one or more Wild symbols which symbols replace any or all other symbols in determining winning outcomes. Alternatively, wild symbols may only replace limited subsets of the other symbols, e.g. Diamonds and Rubies only. Wild symbols, therefore, increase the possibility of a player achieving winning combinations and the pay table would be reconfigured to reflect that the wild symbols are in use.

Each wild symbol may also be used to affect pay outs that utilize one or more wild symbols. For example, a wild symbol used in a winning combination of symbols, may act as a multiplier to double the value of the winning combination. The game can also be configured so that the wild symbols increases or decreases the value of any pay out in any manner which results in an average value that can be utilized to control the gaming machine's overall average pay outs. Still further the Wild feature can be configured to apply when the Wild symbol is in a winning combination and appears in one or more designated positions, e.g. only when in columns B and D. Still further different Wild symbols may be utilized which act with all or less than all symbol types such as a Wild symbol of Diamonds and Rubies and a different Wild symbol for the other game symbols.

The data structure may also include data representing one or more "scatter pay" symbols. A scatter pay awards the player a predetermined payout for the appearance of one or more scatter symbols at the display 18, or combination of scatter symbols, anywhere in the matrix or in predetermined positions, e.g. in a column or row. Thus, if more than one scatter symbol is required to form a scatter pay, the scatter symbols in one embodiment of the invention, do not need to be located in adjacent positions.

Scatter pays issue a specific number of credits, free spins, and/or other awards. The awards may be issued immediately or after the completion of a bonus feature (i.e. animation sequence or animated bonus game). The calculation of the scatter pay award depends on the type of scatter pay. For example, for scatter pays, the total number of credits wagered multiplies the number of credits indicated by the pay table. For example, a player may wager ten total credits, spin the reels, and collect twice the amount indicated on the pay table for a scatter pay appearing anywhere on the slot reels. The scatter pay award may increase based upon the number of scatter symbols triggering the award. For example, two scatter pay symbols may result in an award of 2× the total wager, with three symbols resulting in a 5× award.

The game device and method according to the present invention may also have the following additional or alternative features. In one embodiment the game may include in the data structure data representing stagnant symbols which, when selected and first positioned in the matrix, do not slide and are not removed or replaced. These stagnant symbols may be configured so that they cannot be included in any winning combination and do not move thus blocking or frustrating the assembly of winning combinations. Alternatively, the stagnant symbols may be included in winning combinations.

In yet another embodiment, the game hand may end by one of a predetermined number of reconstitution cycles or the appearance of one or more terminating symbols or symbol combination.

The many features and advantages of the invention are apparent from the detailed specification and examples above, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

What is claimed is:

1. An electronic game device for a player comprising:
   a) a display;
   b) a game processor and a data structure storing data representing a plurality of game symbols and data representing a predetermined award schedule for winning outcome sets;
   c) a wager input apparatus for the player to input a wager to play the game and prompt play, the processor configured to, in response to prompting of play,
      (i) select, assign and control the display to display a selected game symbol into each coordinate of a game matrix having columns C and rows R, where C and R are at least 3,
      (ii) compare the symbols displayed in the game matrix to determine whether a predetermined number of like symbols are disposed in at least one of a plurality predetermined winning patterns defining a winning outcome set,
      (iii) determine an award for each winning outcome set,
      (iv) remove the symbols of each winning outcome set from the display,
      (v) select, assign and display symbols to replace the removed symbols to reconstitute the game matrix, and
      (vi) repeat steps (ii) through (v) until there are no winning outcome sets.

2. The device of claim 1 comprising the data structure storing data representing at least one multiplier symbol having a multiplication attribute, the processor configured to apply the attribute to any award issued when the multiplier is selected and displayed.

3. The device of claim 2 comprising the processor being configured to apply the attribute to any award issued when the multiplier is selected, displayed and included in a winning outcome set pattern.

4. The device of claim 1 comprising the data structure including at least one wild symbol which is designated as wild for determining winning outcome sets.

5. The device of claim 1 comprising the data structure storing for the winning outcome sets at least a plurality of differing awards based upon the symbol-type of the winning outcome sets.

6. The device of claim 1 comprising the data structure storing data corresponding to at least one scatter pay symbol and the processor configured to, in response to selection and display of a predetermined number of the multiplier symbols, issue a scatter pay award.

7. The device of claim 1 comprising the processor configured to reconstitute the game matrix by controlling the display to re-position the symbols downward to fill the positions of the removed symbols and selecting and displaying new symbols to reconstitute the matrix.

8. The device of claim 1 comprising the processor configured to reconstitute the game matrix by and selecting and displaying at the display new symbols in the positions of the removed symbols.

9. An electronic game device for a player comprising:
   a) a display;
   b) a game processor and a data structure storing data representing a plurality of game symbols and data representing a predetermined award schedule for winning outcome sets;
   c) a wager input apparatus for the player to input a wager to play the game and prompt play, the processor configured to, in response to prompting of play,
      (i) select, assign and control the display to display a game symbol into each coordinate of a game matrix having columns C and rows R, where C and R are at least 3,
      (ii) compare the symbols of the coordinates to determine whether a predetermined number of like symbols are disposed in at least one of a plurality of predetermined winning patterns defining a winning outcome set,
      (iii) determine an award for each winning outcome set,
      (iv) remove the symbols of each winning outcome set from the display,
      (v) select, assign and display symbols to replace the removed symbols to reconstitute the game matrix, and
      (vi) repeat steps (ii) through (v) until there are no winning outcome sets.

10. The electronic game device of claim 9 in which the processor is configured to define the winning symbols to include at least two symbols arranged in adjacent locations in the game matrix.

11. The electronic game device of claim 9 in which the processor is configured to define the winning symbols to include at least two symbols arranged in any location in the game matrix.

12. An electronic game device for a player comprising:
a) a display;
b) a game processor and a data structure storing data representing a plurality of game symbols and data representing a predetermined award schedule for winning outcome sets;
c) a wager input apparatus for the player to input a wager on a pay line to play the game and prompt play, the processor configured to, in response to prompting of play,
  (i) select, assign and control the display to display a game symbol into each coordinate of a game matrix having columns C and rows R, where C and R are at least 3,
  (ii) compare the symbols of the coordinates to determine whether a predetermined number of like symbols are disposed in at least one of a plurality of predetermined winning patterns defining a winning outcome set,
  (iii) define the winning patterns to include at least two symbols arranged in an adjacent relationship in at least one of a horizontal pattern, a vertical pattern and a diagonal pattern,
  (iv) determine an award for each winning outcome set based upon at least one of the criteria of
    (a) amount wagered and
    (b) number of symbols in the winning outcome set,
  (v) remove the symbols of each winning outcome set from the display,
  (vi) select, assign and display symbols to replace the removed symbols to reconstitute the game matrix, and
  (vii) repeat steps (ii) through (vi) until there are no winning outcome sets.

13. An electronic game device for a player comprising:
a) a display;
b) a game processor and a data structure storing data representing a plurality of game symbols and data representing a predetermined award schedule for winning outcome sets;
c) a wager input apparatus for the player to input a wager on a pay line to play the game and prompt play, the processor configured to, in response to prompting of play,
  (i) select, assign and control the display to display a game symbol into each coordinate of a game matrix having columns C and rows R, where C and R are at least 3,
  (ii) compare the symbols of the coordinates to determine whether a predetermined number of like symbols are disposed in at least one of a plurality of predetermined winning patterns defining a winning outcome set,
  (iii) define the winning patterns to include at least two symbols,
  (iv) determine an award for each winning outcome set based upon at least one of the criteria of
    (a) amount wagered and
    (b) number of symbols in the winning outcome set,
  (v) remove the symbols of each winning outcome set from the display,
  (vi) select, assign and display symbols to replace the removed symbols to reconstitute the game matrix, and
  (vii) repeat steps (ii) through (vi) until there are no winning outcome sets.

14. The electronic game device of claim 13 in which the processor is configured to define the winning symbols to include at least two symbols arranged in an adjacent location in the game matrix.

15. The electronic game device of claim 13 in which the processor is configured to define the winning symbols to include at least two symbols arranged anywhere in the game matrix.

16. An electronic game device for a player comprising:
a) a display;
b) a game processor and a data structure storing data representing a plurality of game symbols and data representing a predetermined award schedule for winning outcome sets;
c) a wager input apparatus for the player to input a wager to play the game and prompt play, the processor configured to, in response to prompting of play,
  (i) select, assign and control the display to display a selected game symbol into each coordinate of a game matrix having columns C and rows R, where C and R are at least 3,
  (ii) compare the symbols of the coordinates to determine whether a predetermined number of like symbols are disposed in at least one of a plurality of predetermined winning patterns defining a winning outcome set,
  (iii) define the winning patterns to include at least three of the wagered upon symbol type arranged in an adjacent relationship in a row,
  (iv) determine an award for each winning outcome set,
  (v) remove the symbols of each winning outcome set from the display,
  (vi) select, assign and display symbols to replace the removed symbols, and
  (vii) repeat steps (ii) through (vi) until there are no winning outcome sets.

17. The device of claim 16 comprising the data structure storing data representing at least one multiplier symbol having a multiplication attribute, the processor configured to apply the attribute to any award issued when the multiplier is selected and displayed.

18. The device of claim 17 comprising the processor being configured to apply the attribute to any award issued when the multiplier is selected, displayed and included in a winning outcome set pattern.

19. The device of claim 16 comprising the data structure including at least one wild symbol which is designated as wild for determining winning outcome sets.

20. The device of claim 16 comprising the data structure storing for the winning outcome sets at least a plurality of differing awards based upon the symbol-type of the winning outcome sets.

21. The device of claim 16 comprising the data structure storing data corresponding to at least one scatter pay symbol and the processor configured to, in response to selection and display of a predetermined number of the multiplier symbols, issue a scatter pay award.

22. An electronic game device for a player comprising:
a) a display;
b) a game processor and a data structure storing data representing a plurality of game symbols and data representing a predetermined award schedule for winning outcome sets;
c) a wager input apparatus for the player to input a wager to play the game and prompt play, the processor configured to, in response to prompting of play, (i) select, assign and control the display to display a game symbol into each coordinate of a game matrix having columns C and rows R, where C and R are at least 3, (ii) compare the symbols of the coordinates to determine whether a predetermined number of like symbols are disposed in at least one of a plurality of predetermined winning patterns defining a winning outcome set, (iii) determine an award for each winning outcome set, (iv) remove the symbols of each winning outcome set from the display, (v) select, assign and display symbols to replace. the removed symbols, and (vi) repeat steps (ii) through (v) until there are no winning outcome sets.

23. The electronic game device of claim 22 in which the processor is configured to define the winning symbols to include at least two symbols arranged in an adjacent location in the game matrix.

24. The electronic game device of claim 22 in which the processor is configured to define the winning symbols to include at least two symbols arranged anywhere in the game matrix.

25. An electronic game device for a player comprising:

a) a display;

b) a game processor and a data structure storing data representing a plurality of game symbols and data representing a predetermined award schedule for winning outcome sets;

c) a wager input apparatus for the player to input a wager on a pay line to play the game and prompt play, the processor configured to, in response to prompting of play, (i) select, assign and control the display to display a game symbol into each coordinate of a game matrix having columns C and rows R, where C and R are at least 3, (ii) compare the symbols of the coordinates to determine whether a predetermined number of like symbols are disposed in at least one of a plurality of predetermined winning patterns defining a winning outcome. set, (iii) define the winning patterns to include at least two symbols arranged in an adjacent relationship in a horizontal, vertical and/or diagonal pattern, (iv) determine an award for each winning outcome set based upon at least one of the criteria of (a) amount wagered and (b) number of symbols in the winning outcome set, (v) remove the symbols of each winning outcome set from the display, (vi) select, assign and display symbols to replace the removed symbols, and (vii) repeat steps (ii) through (vi) until there are no winning outcome sets.

26. The electronic game device of claim 25 in which the processor is configured to define the winning symbols to include at least two symbols arranged in an adjacent location in the game matrix.

27. The electronic game device of claim 25 in which the processor is configured to define the winning symbols to include at least two symbols arranged anywhere in, the game matrix.

28. An electronic game device for a player comprising:

a) a display;

b) a game processor and a data structure storing data representing a plurality of game symbols and data representing a predetermined award schedule for winning outcome sets;

c) a wager input apparatus for the player to input a wager on a pay line to play the game and prompt play, the processor configured to, in response to prompting of play, (i) select, assign and control the display to display a game symbol into each coordinate of a game matrix having columns C and rows R, where C and R are at least 3, (ii) compare the symbols of the coordinates to determine whether a predetermined number of like symbols are disposed in at least one of a plurality of predetermined winning patterns defining a winning outcome set, (iii) define the winning patterns to include at least two symbols, (iv) determine an award for each winning outcome set based upon at least on of the criteria of amount wagered and number of symbols in the winning outcome set, (v) remove the symbols of each winning outcome set from the display, (vi) select, assign and display symbols to replace the removed symbols, and (vii) repeat steps (ii) through (vi) until there are no winning outcome sets.

29. The electronic game device of claim 28 in which the processor is configured to define the winning symbols to include at least two symbols arranged in an adjacent location on a pay line.

30. The electronic game device of claim 28 in which the processor is configured to define the winning symbols to include at least two symbols arranged anywhere in the game matrix.

31. An electronic game device for a player comprising:

a) a display;

b) a game processor and a data structure storing data representing a plurality of game symbols and data representing a predetermined award schedule for winning outcome sets;

c) a wager input apparatus for the player to input a wager to play the game and prompt play, the processor configured to, in response to prompting of play, (i) select, assign and control the display to display a game symbol into each coordinate of a game matrix having columns C and rows R, where C and R are at least 3, (ii) compare the symbols of the coordinates to determine whether a predetermined number of like symbols are disposed in at least one of a plurality of predetermined winning patterns defining a winning outcome set, (iii) determine an award for each winning outcome set, (iv) remove the symbols of each winning outcome set from the display, (v) reconstitute the game matrix, and (vi) repeat steps (ii) through (v) until there are no winning outcome sets.

32. The electronic game device of claim 31 in which the processor is configured to define the winning symbols to include at least two symbols arranged in adjacent locations in the game matrix.

33. The electronic game device of claim 31 in which the processor is configured to define the winning symbols to include at least two symbols arranged in any location in the game matrix.

34. An electronic game device for a player comprising:
a) a display;
b) a game processor and a data structure storing data representing a plurality of game symbols and data representing a predetermined award schedule for winning outcome sets;
c) a wager input apparatus for the player to input a wager on a pay line to play the game and prompt play, the processor configured to, in response to prompting of play,
   (i) select, assign and control the display to display a game symbol into each coordinate of a game matrix having columns C and rows R, where C and R are at least 3,
   (ii) compare the symbols of the coordinates to determine whether a predetermined number of like symbols are disposed in at least one of a plurality of predetermined winning patterns defining a winning outcome set,
   (iii) define the winning patterns to include at least two symbols arranged in an adjacent relationship in a horizontal, vertical and/or diagonal pattern,
   (iv) determine an award for each winning outcome set based upon at least one of the criteria of
      (a) amount wagered and
      (b) number of symbols in the winning outcome set,
   (v) remove the symbols of each winning outcome set from the display,
   (vi) reconstitute the game matrix, and
   (vii) repeat steps (ii) through (vi) until there are no winning outcome sets.

35. An electronic game device for a player comprising:
a) a display;
b) a game processor and a data structure storing data representing a plurality of game symbols and data representing a predetermined award schedule for winning outcome sets;
c) a wager input apparatus for the player to input a wager on a pay line to play the game and prompt play, the processor configured to, in response to prompting of play,
   (i) select, assign and control the display to display a game symbol into each coordinate of a game matrix having columns C and rows R, where C and R are at least 3,
   (ii) compare the symbols of the coordinates to determine whether a predetermined number of like symbols are disposed in at least one a plurality of predetermined winning patterns defining a winning outcome set,
   (iii) define the winning patterns to include at least two symbols,
   (iv) determine an award for each winning outcome set based upon at least one of the criteria of
      (a) amount wagered and
      (b) number of symbols in the winning outcome set,
   (v) remove the symbols of each winning outcome set from the display,
   (vi) reconstitute the game matrix, and
   (vii) repeat steps (ii) through (vi) until there are no winning outcome sets.

36. The electronic game device of claim 35 in which the processor is configured to define the winning symbols to include at least two symbols arranged in an adjacent location in the game matrix.

37. The electronic game device of claim 35 in which the processor is configured to define the winning symbols to include at least two symbols arranged anywhere in the game matrix.

38. The device of claim 1 which includes inputting a wager on at least one symbol type.

39. The device of claim 38, wherein the processor is configured to define the winning patterns to include at least three of the wagered upon symbol type arranged in an adjacent relationship in a row.

40. The device of claim 1, which includes inputting a wager on a payline.

41. The device of claim 40, wherein the processor is configured to define the winning patterns to include a plurality of the symbol types arranged on the wagered on payline.

* * * * *

UNITED STATES PATENT AND TRADEMARK OFFICE
CERTIFICATE OF CORRECTION

PATENT NO. : 7,357,713 B2
APPLICATION NO. : 11/073884
DATED : April 15, 2008
INVENTOR(S) : Marks et al.

It is certified that error appears in the above-identified patent and that said Letters Patent is hereby corrected as shown below:

On the Title page item (54) and Col. 1, line 4, change the word "METRIX" to "MATRIX"

IN THE SPECIFICATION:

In Column 1, Line 49, change "and" to --an-- between the words "selects" and "outcome"

In Column 2, Line 15, change "exchange" to --exchanging--

In Column 2, Line 41, change "a" to --as--

In Column 3, Line 63, change "deice" to --device--

In Column 5, Line 5, change "in to" to --into--

In Column 5, Line 34, delete "," after "as"

In Column 6, Line 5, change "If" to --In--

In Column 7, Line 13, insert --of-- between "outcome" and "the"

In Column 10, Line 4, insert --are-- between "there" and "one"

In Claim 22, Column 15, Line 13, delete "." between "replace" and "the"

In Claim 25, Column 15, Line 44, delete "." between "outcome" and "set"

In Claim 27, Column 15, Line 66, delete "," between "in" and "the"

In Claim 28, Column 16, Line 23, change "on" to --one--

UNITED STATES PATENT AND TRADEMARK OFFICE
CERTIFICATE OF CORRECTION

PATENT NO. : 7,357,713 B2
APPLICATION NO. : 11/073884
DATED : April 15, 2008
INVENTOR(S) : Marks et al.

It is certified that error appears in the above-identified patent and that said Letters Patent is hereby corrected as shown below:

In Claim 35, Column 18, Line 7, insert --of-- between "one" and "a"

Signed and Sealed this

Sixth Day of January, 2009

JON W. DUDAS
*Director of the United States Patent and Trademark Office*